United States Patent
Elmaliah

(10) Patent No.: US 9,762,429 B2
(45) Date of Patent: Sep. 12, 2017

(54) CONTROL PROTOCOL ENCAPSULATION

(71) Applicant: Marvell International Ltd., Hamilton (BM)

(72) Inventor: Ilan Elmaliah, Kohav Michael (IL)

(73) Assignee: Marvell International Ltd., Hamilton (BM)

( * ) Notice: Subject to any disclaimer, the term of this patent is extended or adjusted under 35 U.S.C. 154(b) by 190 days.

(21) Appl. No.: 14/611,903

(22) Filed: Feb. 2, 2015

(65) Prior Publication Data

US 2015/0146732 A1    May 28, 2015

Related U.S. Application Data

(63) Continuation of application No. 11/933,764, filed on Nov. 1, 2007, now Pat. No. 8,948,173.

(60) Provisional application No. 60/889,802, filed on Feb. 14, 2007.

(51) Int. Cl.
*H04L 12/24*      (2006.01)
*H04L 29/06*      (2006.01)

(52) U.S. Cl.
CPC .......... *H04L 41/0246* (2013.01); *H04L 29/06* (2013.01); *H04L 41/0226* (2013.01); *H04L 69/08* (2013.01)

(58) Field of Classification Search
CPC ............. H04L 12/4633; H04L 67/1097; H04L 12/4625; H04L 49/357; H04L 49/351; H04L 69/22; H04L 45/04
See application file for complete search history.

(56) References Cited

U.S. PATENT DOCUMENTS

| | | | |
|---|---|---|---|
| 7,174,413 | B2 | 2/2007 | Pettey et al. |
| 7,464,174 | B1 | 12/2008 | Ngai |
| 7,480,303 | B1 | 1/2009 | Ngai |
| 8,374,175 | B2 | 2/2013 | Riley |
| 8,948,173 | B2 | 2/2015 | Elmaliah |
| 2003/0202520 | A1 | 10/2003 | Witkowski et al. |

(Continued)

OTHER PUBLICATIONS

Notice of Allowance in Israeli Application No. 189513, dated Feb. 26, 2013.

(Continued)

*Primary Examiner* — Jackie Zuniga Abad

(57) ABSTRACT

A processor is configured to determine non-core functions to be performed by an unmanaged device disposed on a packet based computer network. A control message generator is configured to (i) generate a point-to-point control message conforming to a point-to-point control protocol for controlling the unmanaged device over a point-to-point serial bus connection to perform the determined non-core functions, and (ii) encapsulate the point-to-point control message in a transport packet for transport over the packet based computer network. A packet transmitter is configured to transmit the transport packet including the encapsulated point-to-point control message via a port coupled to the packet based computer network, the packet based computer network configured to route the transport packet including the encapsulated point-to-point control message based on a header included in the transport packet so that the point-to-point control message is received at the unmanaged device via the packet based computer network.

23 Claims, 9 Drawing Sheets

(56) References Cited

U.S. PATENT DOCUMENTS

| | | | |
|---|---|---|---|
| 2004/0054747 A1 | 3/2004 | Breh et al. | |
| 2006/0184711 A1* | 8/2006 | Pettey | H04L 69/18 710/316 |
| 2008/0195747 A1 | 8/2008 | Elmailah | |

OTHER PUBLICATIONS

Suzuki, et al., "ExpressEther—Ethernet-Based Virtualization Technology for Reconfigurable Hardware Platform," *14th Symposium on High-Performance Interconnects*, (Aug. 2006).

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Sections 1-5 (Dec. 9, 2005).

Chen, "Home Network Basis: Transmission Environments and Wired/Wireless Protocols," Prentice Hall, 26 pages (Jul. 2003).

\* cited by examiner

CONTROL PROTOCOL ENCAPSULATION

CROSS-REFERENCES TO RELATED APPLICATIONS

This application is a continuation of U.S. application Ser. No. 11/933,764, entitled "Control Protocol Encapsulation," filed Nov. 1, 2007, now U.S. Pat. No. 8,948,173, which claims the benefit of U.S. Provisional Application No. 60/889,802, entitled "PCI EXPRESS ENHANCE SUGGESTION," filed on Feb. 14, 2007. The applications referenced above are hereby incorporated by reference herein in their entireties.

BACKGROUND

Several bus technologies have been developed for communication between electronic devices, management of electronic devices, or both, particularly components used in computer architectures. For example, the Industry Standard Architecture (ISA) bus was used to connect a microprocessor to system resources such as memory, input/output ports, and video controllers. Over the years, advances have been made in bus architectures allowing faster access, an increased number of devices supported, and higher data throughput. Examples of faster architectures are the Enhanced ISA (EISA), micro channel architecture, and Vesa bus. A later contender in this arena is the peripheral interconnect (PCI) bus, a parallel architecture, originally with a 32-bit channel width and a 33 MHz clock speed. Later revisions allowed wider paths and higher bus speeds.

However, wide buses such as PCI can be difficult to route on a circuit board and wide, high clock-rate busses can propagate clock noise. As a result, the PCI bus reached a performance limit. As packet technology has developed, a new bus architecture arose around packet-based transport using serial interconnects, or lanes, rather than parallel bus architectures. Examples of packet-based bus architectures include Peripheral Component Interconnect Express (PCIe), Hypertransport, Infiniband, and RapidIO.

Another advantage of newer packet-based bus architectures involves higher protocol layers of the bus architecture that support robust signaling for acknowledgement, polling, interrupts, etc. However, the physical implementations of such busses can limit the useful distance over which such architectures are useful. For example, the PCIe version 1.0 bus has a limit of 20 inches between devices.

SUMMARY

The advantages of packet-based bus architectures, such as robust signaling, may be realized over longer distances, or over different physical media even at short distances, by encapsulating the messages of the packet-based bus architecture in a packet of a transport protocol that works over longer distances, such as Ethernet. Thus the robust control offered by packet-based bus architectures, such as PCIe, may be made available to physically removed components.

A by-product of Ethernet message encapsulation allows devices with a management capability to control unmanaged devices, either locally or over a distance. In one embodiment, nearly identical devices, one, a managed device with a management capability (e.g. a processor) and the other, an unmanaged device without a management capability are deployed. The managed device may handle the configuration and control of the unmanaged device. For example, a remote display controller may use a local display controller for setup, configuration management, and button processing.

In another embodiment, a managed device may be dissimilar from the unmanaged device, but still capable of supporting setup, configuration, and operational activities. For example, a managed router may be programmed to support its own functions as well as those of one or more unmanaged firewalls.

In situations where security is not a particular concern, such as the display controller example, general Ethernet traffic, such as data for display, may share a network with Ethernet encapsulated control packets. In situations where security is a significant concern, such as with a router or firewall, separate ports may be used to carry control traffic and general Ethernet traffic. In another embodiment, the native security of the Ethernet protocol can be used to apply security over the encapsulated packets.

In the course of performing the management function, a managed device may first determine what action is required at the unmanaged device. A command may be developed and formatted into a packet-based bus architecture protocol, such as PCIe. Then, the PCIe formatted command may be forwarded to a transport network protocol handler and wrapped or encapsulated in longer distance protocol format, such as Ethernet. The Ethernet-formatted PCIe command may then be forwarded to the unmanaged device. At the unmanaged device, the packet may be unwrapped or de-encapsulated and the PCIe protocol command forwarded to a controller or register to effect the desired change in the unmanaged device. Return information, such as acknowledgements or interrupts, may follow the same process in reverse.

In one embodiment, a master device in communication with a slave device may include a controller means for sending commands to and receiving responses from the slave device. A lane protocol means may be used to format control commands for the slave device. A frame protocol means may be used to encapsulate the formatted control commands. The slave device may use corresponding frame and lane protocol means for extracting the formatted message and extracting the original control commands.

DETAILED DESCRIPTION

Figure 1:
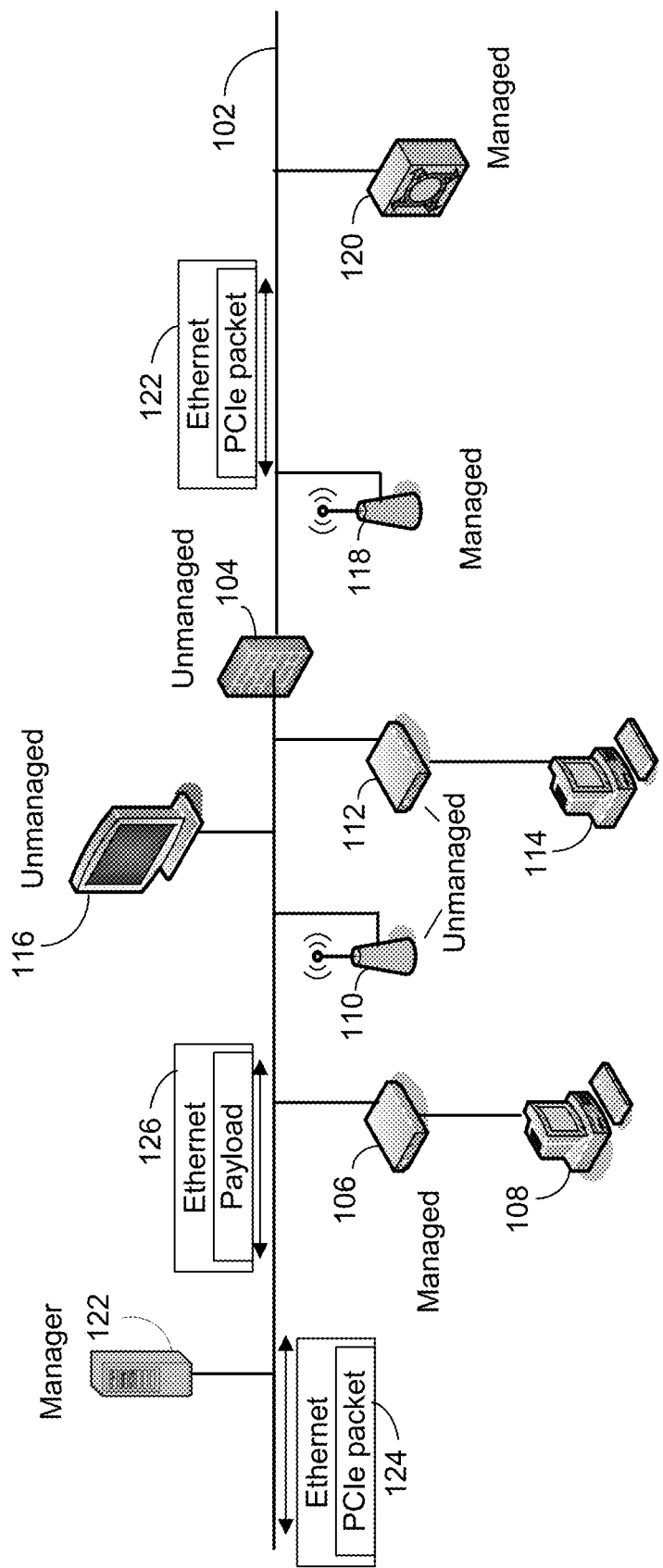
FIG. 1 is a block diagram of an example network with a variety of electronic devices.

FIG. 1 is a block diagram of an example network 102 including a variety of electronic devices. The network 102, for example, an Ethernet protocol network, may be used to provide a data path for network traffic. A firewall 104 may be used to protect unwanted traffic on one side of the network 102 from reaching the other side. A router 106 may be used to communicatively connect a computer 108 to the network 102. A wireless access point 110 may be used to provide wireless connections to mobile and portable devices (not depicted) to communicatively connect these devices to the network 102.

A second router 112 may be used to communicatively connect another computer 114 to the network 102. A display device 116 with an integrated controller (not depicted) may be communicatively connected to the network 102 and used to display information provided to it via the network 102.

A second wireless access point 118 may also provide wireless service to mobile and portable devices. The wireless access point 118 may be managed from an internal function point of view. Also in this exemplary embodiment is a communications controller 120, that may be used to manage one or more wireless access points, for example access point 110. The communications controller may also support external functions of both managed 118 and unmanaged 110 wireless access points, for example, to support roaming between the two wireless access points 110 and 118.

The computers 108 and 114 are inherently managed devices, that is, their architecture includes the processing power, memory, input/output support, non-volatile memory, etc. to configure and operate themselves. Other devices may or may not be considered as managed.

The router 106 may be managed, having the capability to support not only routed data traffic, but to provide a user interface data, for example, to the computer 108 and to process initial setup, configuration changes, and operational decision-making, such as recovery from a hang. On the other hand, the unmanaged router 112 may be not support control functions internally. It may depend on a remote unit to perform even simple tasks such as responding to button pushes. The remote unit providing control may be one of the computers 108, 114, a similar managed unit, such as the router 106, or a dissimilar managed unit, such as the communications controller 120. Other devices may be either managed or unmanaged, for the purpose of this illustration, the firewall 104 and the display 116 will be considered to be unmanaged.

The network 102 is shown carrying Ethernet packets 122, 124, 126. Ethernet packets 122 and 124 illustrate Ethernet packets with encapsulated PCIe messages. Ethernet packet 126 shows that packets with a standard payload may also be transported on the network 102.

In operation, managed and unmanaged devices may exhibit different behaviors, especially related to non-core functions. Core functions are those related to the main purpose of the device. For example, a router's core function is receiving data packets on one port, determining where they should go, and sending them out via another port. Non-core functions may include operating status lights, reading buttons, providing a user interface for setup activities via a web session, etc. A managed device may provide a rich set of non-core functions, while an unmanaged device may provide only enough non-core functions to support control by the managed device. The managed device may allow implementation of features in the non-managed device that would not be supported by the hardware and software/firmware alone.

A managed device, such as the router 106 may respond to a login attempt from computer 108 and support an interactive session with the computer for initial setup and configuration. The initial setup may include providing user interface screens for changing a default password, dynamic host configuration protocol (DHCP) default values, media access control (MAC) filtering, etc. The support for the interactive session may also include value qualification, input prompts, etc. When operating, the router 106 may be capable of handling errors and changing conditions. For example, if another computer (not depicted) is added on the downstream side of the router (the same side as computer 108), the router may automatically detect traffic on the given port, establish communication with the device and assign an IP address using the next default value established during the initial DHCP setup. The non-core functions of the router 106 are critical to its ability to operate, but lie idle the vast majority of the product's life.

In contrast, the unmanaged router 112, may not be capable of supporting the user interface for the initial setup, nor be capable of handling real time changes, such as adding or dropping a downstream device. In a cost-sensitive installation, the unmanaged router, because of its reduced parts count, may be significantly cheaper than a managed device. To support the cost reduction, the unmanaged router 112 may rely on a managed device, e.g. router 106, to supply such missing functions as user interface or configuration functions.

When initially started, an unmanaged device, such as the unmanaged router 112, may wait for an initialization message, using a default IP address and a factory-programmed login identifier/password. The first login by a managed device or dedicated manager may establish a binding of the unmanaged device to the managed device, as well setting a password for future use. A secure socket level 2 (SSL2) connection may be used for password training to prevent eavesdropping and compromise of the new password. After initial binding, the managed device may send all interrupts and control requests to the managed device and accept control commands from the managed device. The unmanaged device may have a simple controller or logic circuit with registers that manage communication and process inbound and outbound traffic.

One obvious source of the missing functions in the unmanaged device is a managed version of the same type of device. For example, the router 106 may supply non-core functions to the unmanaged router 112. Similarly, the managed wireless access point 118 may support non-core functions for the unmanaged wireless access point 110. Support from the same type of device is not required, however. The router 106 with management capability may provide non-core services to the firewall 104. The communications controller 120 may provide services to both the unmanaged wireless access point 110 and the display 116.

In one embodiment, a low cost version of a product, such as the wireless access point 110, is capable of standalone operation but without enhanced features. Such enhanced features may include alarm reporting, roaming support, etc. The managed product, e.g. the wireless access point 118, can be optionally used to provide those enhanced features to the unmanaged wireless access point 110.

In another embodiment, a dedicated manager 122 may provide control and management services to a number of unmanaged devices, even disparate devices, such as the firewall 104, the wireless access point 110, the display 116, etc. The dedicated manager 122 may be a computer or server that has network access to a number of unmanaged devices.

Figure 2:
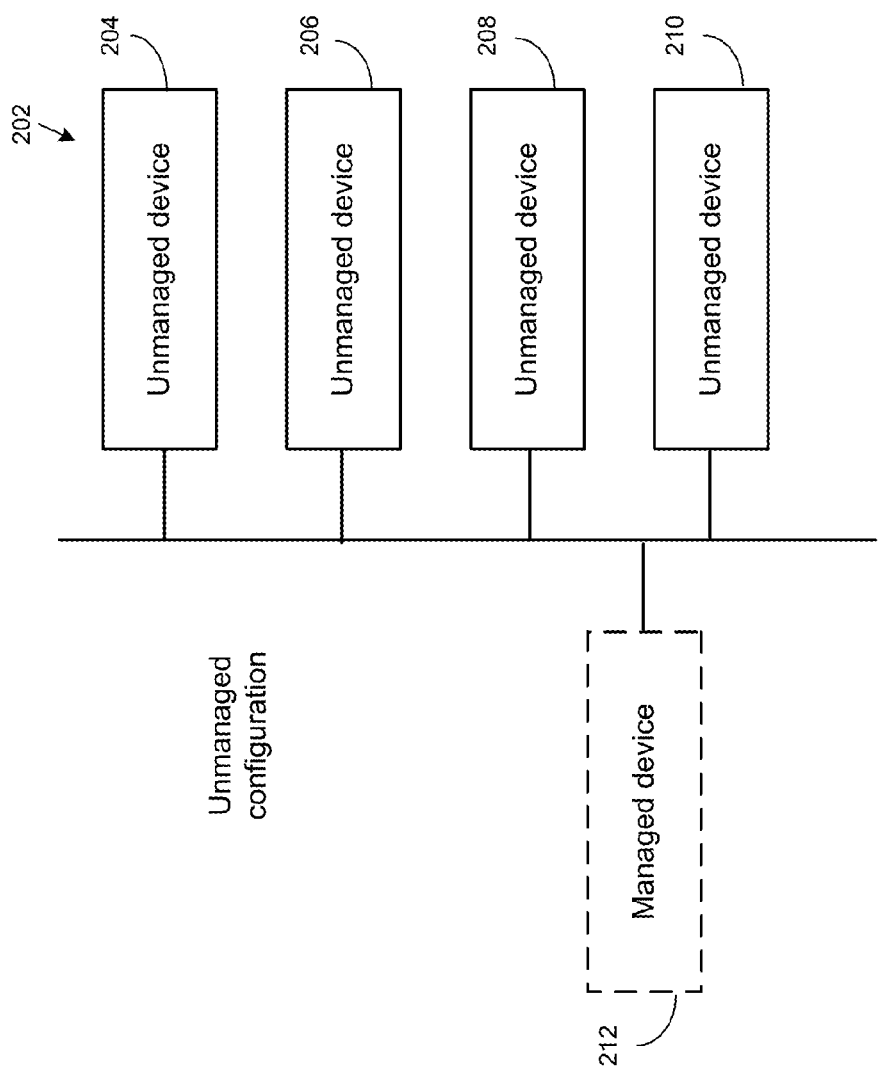
FIG. 2 is a configuration of unmanaged devices.
Figure 3:
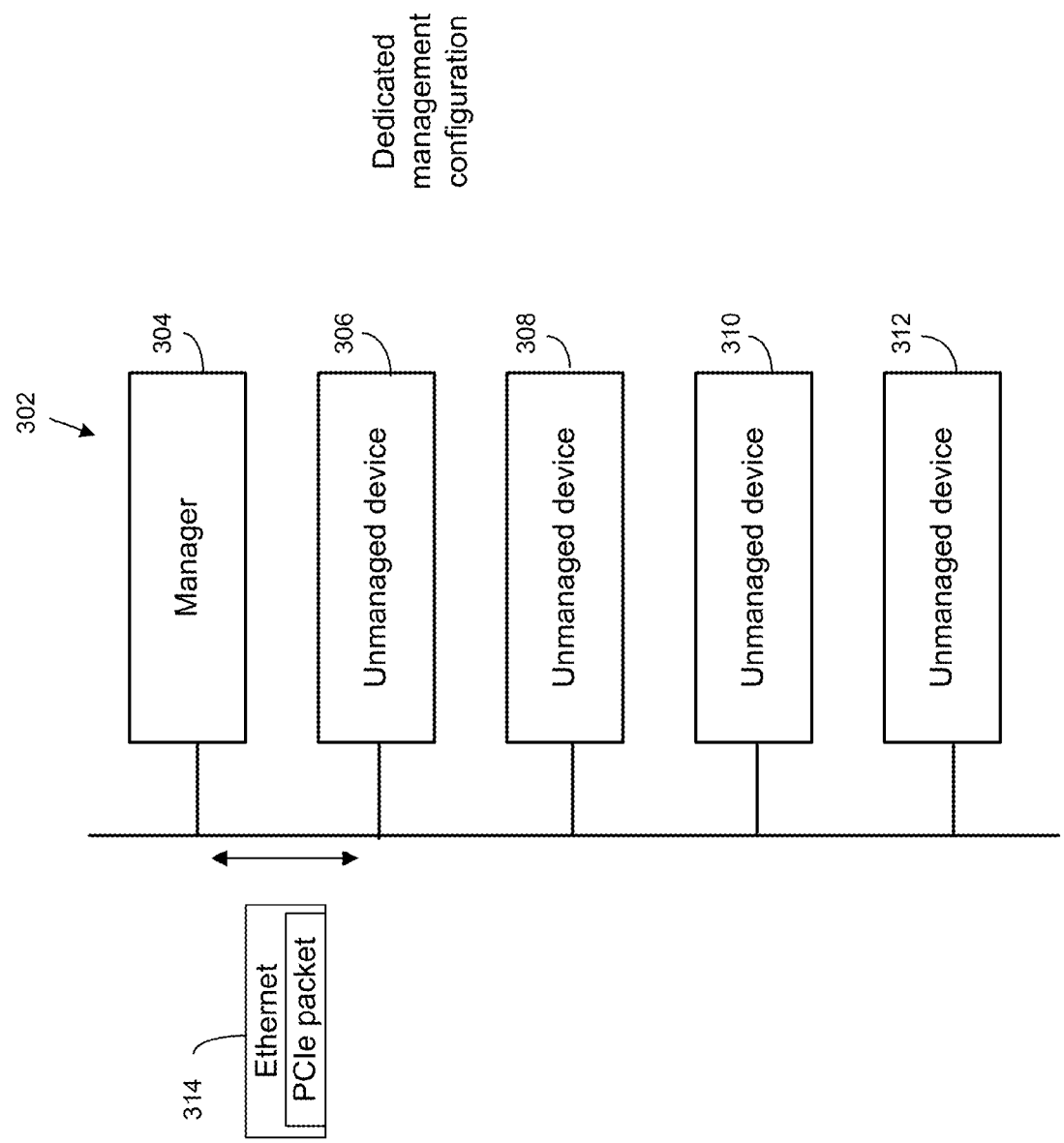
FIG. 3 is a configuration illustrating a managed device supporting unmanaged devices.
Figure 4:
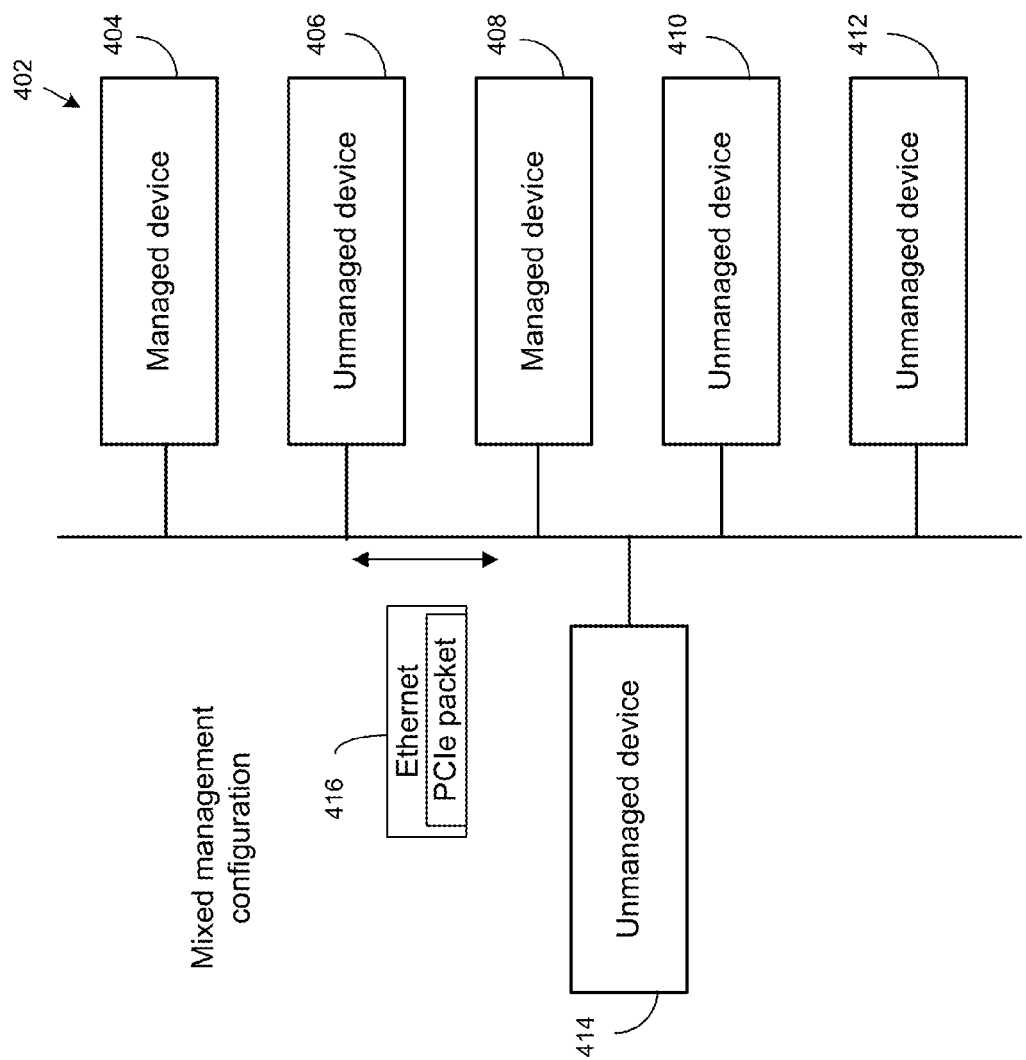
FIG. 4 is a mixed configuration of managed and unmanaged devices.

Referring briefly to FIGS. 2-4, various combinations of managed and unmanaged devices are illustrated. FIG. 2 shows an embodiment of a network 202 of unmanaged devices. As discussed above, unmanaged devices 204, 206, 208, and 210 may be capable of standalone support of basic functions or services. The functions or services may include routing, storage, security, etc. The devices may be homogenous or may be dissimilar. When such functions or services are sufficient to meet a need, the use of unmanaged devices may offer a significant cost savings over higher cost devices with unneeded features. In embodiments where bare minimum functionality is sufficient, the added cost of managed devices may be avoided. In some cases, the unmanaged devices may be configured at the factory or during installation by a manager 212 that is then removed.

FIG. 3 shows another embodiment of a network 302 of devices including a manager 304, and a series of unmanaged devices 306, 308, 310, and 312. The manager 304 may be a dedicated manager, such as the dedicated manager 122 of FIG. 1, or another functional device such as wireless access point 118 or the router 106 of FIG. 1. The manager 304 may provide support, as discussed above, to each of the individual unmanaged devices 306, 308, 310, and 312. The manager may use control packets encapsulated in a transport packet, as illustrated by Ethernet packet 314 encapsulating a PCIe control packet. The manager may allow each unmanaged device 306, 308, 310, and 312 to perform in virtually every aspect on a par with a similarly functioned managed device. Such an implementation is justifiable when the cost savings of unmanaged devices over their respective managed equivalents exceeds the cost of the manager 304.

Because the unmanaged devices 306, 308, 310, and 312 may also be capable of standalone basic functions, a certain degree of fault tolerance may be inherent in such an installation.

FIG. 4 illustrates yet another embodiment of a system 402 of devices. The system 402 may include a first managed device 404, a second managed device 408, and a number of unmanaged devices 406, 410, 412, and 414. The managed devices 404 and 408 may use control packets encapsulated in a transport packet, as illustrated by Ethernet packet 416 encapsulating a PCIe control packet. Several options of binding between devices are possible. In one illustrative embodiment, the managed device 404 may provide support to unmanaged device 406 and managed device 408 may provide support to unmanaged devices 410 and 414. Unmanaged device 412 may operate standalone. The binding process may not be permanent, however. Should the managed device 404 fail or go offline, the unmanaged device 406 may advertise for support service. The managed device 408 may respond to the request.

Rather than depending on an anonymous response to an advertisement for services, other explicit mechanisms may be used. In one embodiment, the managed device 404 may share login credentials for its unmanaged device 406 with other managed devices, such as managed device 408. In the event the managed device 404 either becomes unavailable or indicates it is no longer able to support the unmanaged device 406, another managed device, such as managed device 408 may take over support of the unmanaged device 406. The managed device 408 may take support of the unmanaged device 406 over responsive to several conditions. In one embodiment, the original managed device 404 may signal the managed device 408 to take over support of the unmanaged device 406. In another embodiment, the managed device 408 may monitor the managed device 404 and take over when the managed device 408 is no longer present. In yet another embodiment, the managed device 408 may take over support of the unmanaged device 406 responsive to an explicit request from the unmanaged device 406.

Figure 5:
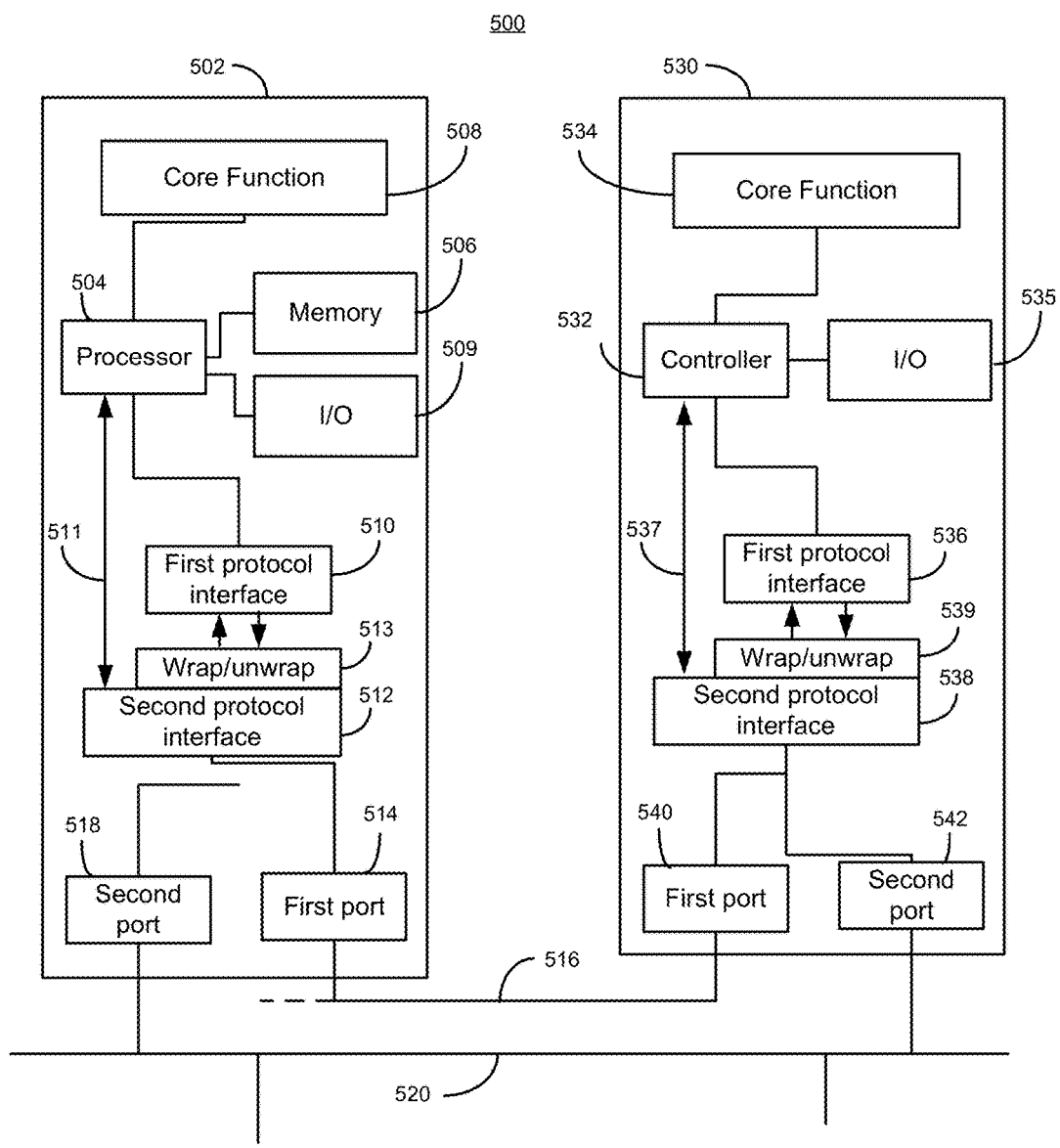
FIG. 5 is a block diagram of a system having a managed device and an unmanaged device.

FIG. 5 is a block diagram of an example system 500 having a managed device 502 and an unmanaged device 530. The managed device 502 may have a processor 504, a memory 506, and a functional core 508. The functional core 508 may implement core functions of the managed device 502. For example, if the managed device 502 is a router, the functional core 508 may be the hardware, firmware, software, etc. that supports data arriving at a port and being routed to another port. If the managed device 502 is a firewall, the functional core 508 may be packet evaluation and blocking. If the managed device is a display controller, the functional core 508 may include driver circuitry, red/green/blue (RGB) processors, etc. In some embodiments, the functional core 508 may be implemented by the processor 504 in conjunction with the memory 506, while in other embodiments, the functional core 508 may be fully or partially separate from the processor 504.

The processor 504, functional core 508, or both, may communicate with outside entities. The communication may take place via one or more protocol interfaces, such as a first protocol interface 510 and a second protocol interface 512. The protocol interfaces 510 and 512 may be coupled to one or more ports, such as a first port 514 that couples to a first network 516, and a second port 518 that couples to a second network 520. The first protocol interface may be a lane-oriented protocol, that is, with dedicated inbound and outbound physical channels. The second protocol interface 512 may have dual ports on the first protocol side to accommodate the lane-oriented traffic. The second protocol interface 513 may have an added layer 513 for wrapping or encapsulating output from the first protocol interface 510 and for unwrapping or de-encapsulating inbound traffic bound for the first protocol interface 510. In other embodiments, the processes of the wrapping and unwrapping layer 513 may be inherent in the second protocol interface 512.

When traffic between the processor 504, core function 508, or both, does not involve the lane-oriented protocol of the first interface 510, they may communicate directly with the second protocol interface 512, as illustrated by data path 511.

An unmanaged device 530 may include a controller 532 and a functional core 534. The controller 532 may be a single chip computer, a logic array, application specific integrated circuit (ASIC), etc. As discussed above, the functional core 534 may support any of several activities or services. The functional core 534 may be the same as that of or similar to the managed device's functional core 508, but may be different, as discussed above with respect to FIG. 1.

As with the managed device 502, the unmanaged device 530 may communicate via one or more protocol interfaces 536 and 538. The protocol interfaces 536 and 538 may be coupled to a first port 540 and a second port 542 for communication over the first and second networks 516 and 520 respectively. As with the managed device 502, the second protocol interface 538 may have an added layer 539 for wrapping or encapsulating output from the first protocol interface 536 and for unwrapping or de-encapsulating inbound traffic destined for the first protocol interface 536. In other embodiments, the processes of the wrapping and unwrapping layer 539 may be inherent in the second protocol interface 538.

When traffic between the controller 532, core function 534, or both, does not involve the lane-oriented protocol of the first protocol interface 536, they may communicate directly with the second protocol interface 538, as indicated by data path 537.

In operation, the managed device 502 may develop instructions for the unmanaged device 530, either as a matter of operation or in response to a received message. The managed device 502 may use a first protocol in developing the instructions and a second protocol for sending the instructions. When sending instructions, they may first be processed by the first protocol interface 510, for example, to place the instructions, or single instruction as the case may be, into a PCIe protocol message. As discussed, the PCIe packet protocol has certain advantages for control applications such as robust error management and interrupt handling. After using the PCIe protocol to develop the instruction packet, the second protocol may be applied for use in preparing a packet for transport to the unmanaged device 530. In one embodiment, the second protocol is an Ethernet packet protocol.

Packets associated with the core functions 508 and 534 may be sent and received over the second ports 518 and 542 coupled to the network 520. In some embodiments, control and status packets using the PCIe protocol, either encapsulated or not encapsulated in Ethernet packets may also use the network 520. When convenience or security dictate, a control/status packet, e.g. PCIe packets encapsulated in Ethernet protocol packets, may use the first ports 514 and 540.

Packets received at the managed device 502 may first process the received packet at the second protocol interface 512 to remove any transport protocol data and may then process the result at the first protocol interface 510 to recover the original message.

The unmanaged device 530 may similarly send and receive packet data. Outbound messages, such as interrupts or status information may first be processed at the first protocol interface 536 and then be processed by the second protocol interface 538. When two ports 540 and 542 are used, the interrupt or status information may be sent via the first port 540 using the first network 516.

Packets received at the unmanaged device 530 may arrive via either the first or second port 540 or 542 respectively. Packets received at the first port 540 may be first processed at the second protocol interface 538 to remove any transport protocol information and then may be processed at the first protocol interface to recover a base message. Should a PCIe protocol packet arrive via the second port 542, it may be forwarded to a managed device to determine whether it is valid and appropriate for the unmanaged device 530.

For explanatory purposes, a cycle of operation in the case in which the unmanaged device 530 is a router will be described. In this example, a new cable is plugged into a previously unused port (not depicted), part of the core function. An interrupt message may be sent from the unmanaged device 530 to a managed device, such as managed device 502. The managed device 502 may calculate the next IP address for DHCP and send the instructions to the unmanaged device for configuring the new line with the new IP address. The unmanaged device 530 may send a confirmation message to the managed device 502 and the managed device may send a further instruction to turn on an indicator (not depicted), such as a light emitting diode (LED) in the I/O section 535 that is above the newly added cable. Lighting the indicator may serve as feedback to a user that the new line has been accommodated.

Figure 6A:
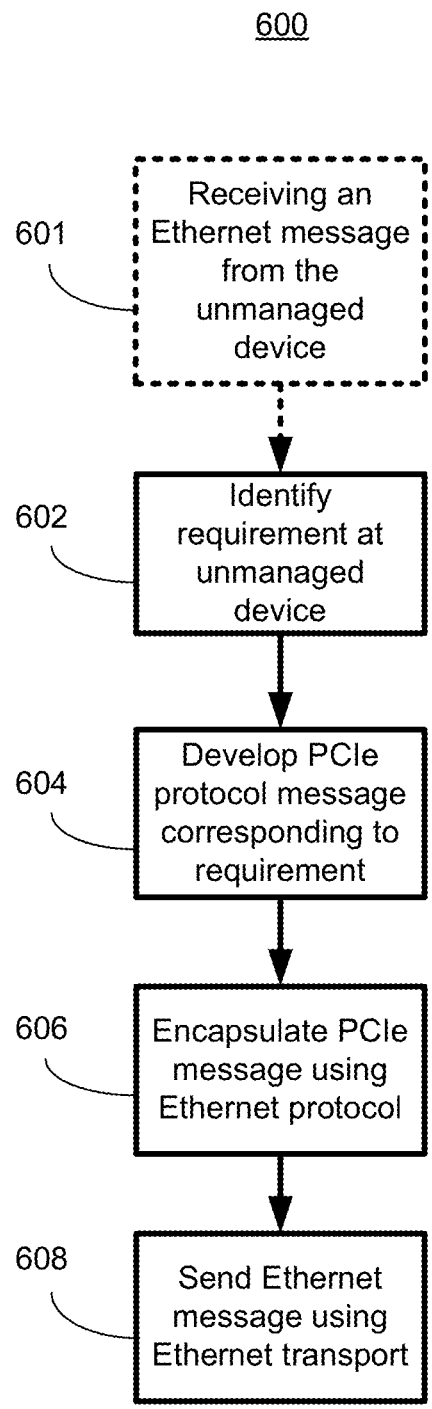
FIG. 6A is a method of controlling an unmanaged device from a managed device.

FIG. 6A is an example method 600 of controlling an unmanaged device, such as unmanaged device 530 of FIG. 5, using support services from a managed device, such as managed device 502. The method 600 may be implemented by the managed device 502, for example.

At block 602, a need at the unmanaged device 530 that requires support from the managed device 502 may be identified. For example, the managed device 502 may identify the need based on an explicit message received from the unmanaged device 530 (optional block 601). Alternatively, the managed device 502 may observe external conditions at the unmanaged device 530, or monitor communication with the unmanaged device 530.

At block 604, the managed device 502 may develop a message for the unmanaged device 530, for example, a PCIe protocol message may be used because of the robustness of the protocol. Other packet-based protocols may also be used to develop messages destined for the unmanaged device 530.

At block 606, the message may be encapsulated in another protocol packet, in an exemplary embodiment, an Ethernet protocol packet. The Ethernet protocol packet, as with other transport protocols, is well suited to routing and delivery, but may not support the end-use applications including control, interrupt handling, etc., as well as another protocol, such as PCIe.

At block 608, the message for the unmanaged device 530, having been encapsulated in the Ethernet protocol packet may be forwarded to the unmanaged device 530 using an Ethernet transport. In one embodiment, regular Ethernet traffic and PCIe messages may share an Ethernet port and associated transport (e.g. network). Security issues may be handled by conventional practice, such as encryption.

In another embodiment, PCIe protocol messages (both encapsulated and plain) used for control may use a separate port dedicated to the PCIe protocol messages. This separate port may not carry standard Ethernet traffic. Standard traffic may be that traffic whose final destination is other than either the managed or unmanaged devices 502, 530. For example, if the managed and unmanaged devices are routers, the packets received, examined, and routed may be considered the standard traffic and use the first port. Packets sent between the managed and unmanaged devices solely for control and support may use the separate port. Such a configuration may afford better security in some situations.

Figure 6B:
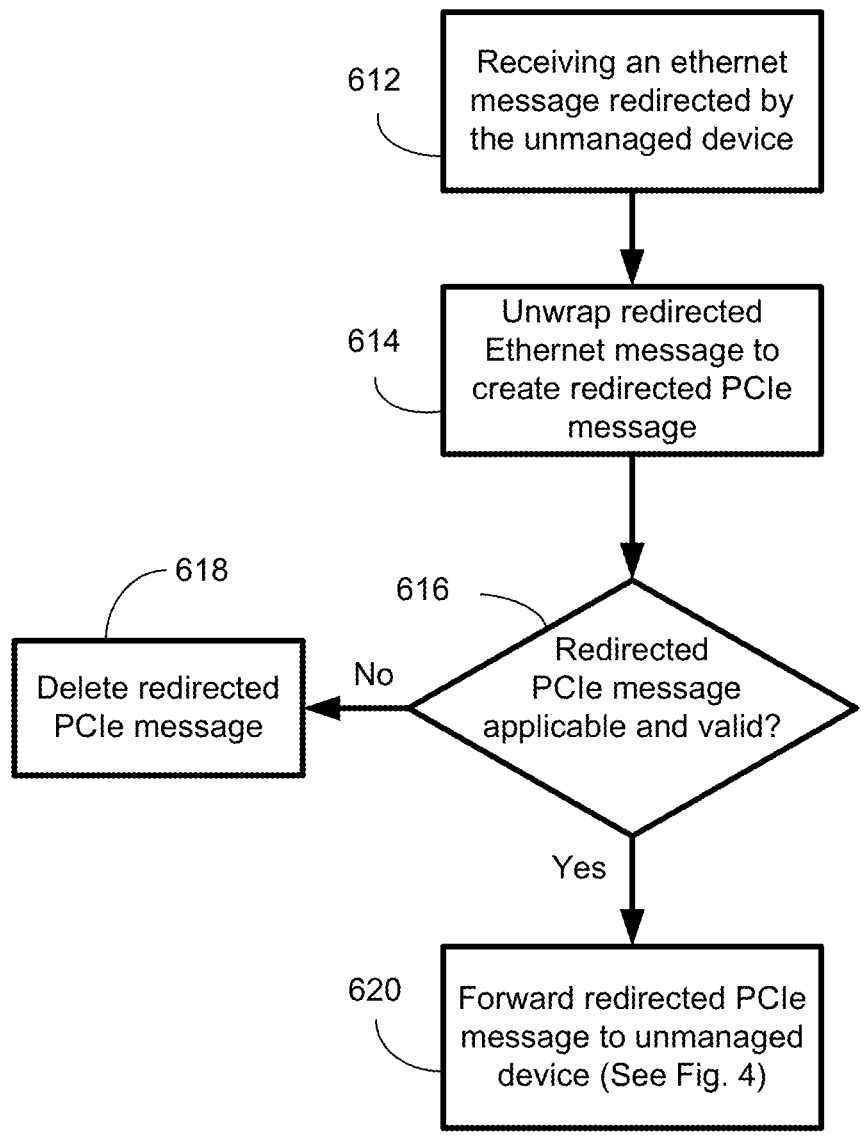
FIG. 6B is an extension of the method of FIG. 6A.

In some instances, the unmanaged device 530 may redirect messages it receives to the managed device 502. As just one example, the unmanaged device 530 may redirect Ethernet messages that it receives and does not know how to process, such as Ethernet messages sent to an unauthorized port. FIG. 6B is an example method 610 of responding to a redirected message received from an unmanaged device 530. The method 610 may be implemented by the managed device 502, for example. In this exemplary embodiment, the message may have originally been sent to the unmanaged device 530 and redirected to the managed device 502. In one embodiment, the determination as to whether to redirect the message may be made at the transport layer so that de-encapsulating the packet can be avoided. At block 612, the managed device 502 may receive the redirected message.

At block 614, the redirected message may be de-encapsulated, that is, the Ethernet protocol-related header and related data may be removed from the redirected message. The resulting message may be a PCIe protocol message with a payload message related to operation of the unmanaged device 530. The payload may be from a related device (not depicted), such as a downstream client of the router. The payload message may, for example, be a request to open a blocked port on the router.

At block 616, the PCIe protocol message may be evaluated to determine whether the PCIe message is applicable and valid. That is, the PCIe message may be evaluated to determine whether it is appropriate to the type of device for which it was addressed and whether its source is allowed to make such a request.

If the PCIe message is not applicable or not valid, the 'no' branch from block 616 may be taken to block 618. At block 618, the PCIe message may simply be discarded.

If the PCIe message is both applicable and valid, the 'yes' branch from block 616 may be taken to block 620. At block 620, the PCIe message may be re-encapsulated in an Ethernet protocol message and forwarded to the unmanaged device 530. Because the message is now from a known managed device, such as managed device 502, the unmanaged device 530 should accept the message and implement any instructions carried in the PCIe message.

Figure 6C:
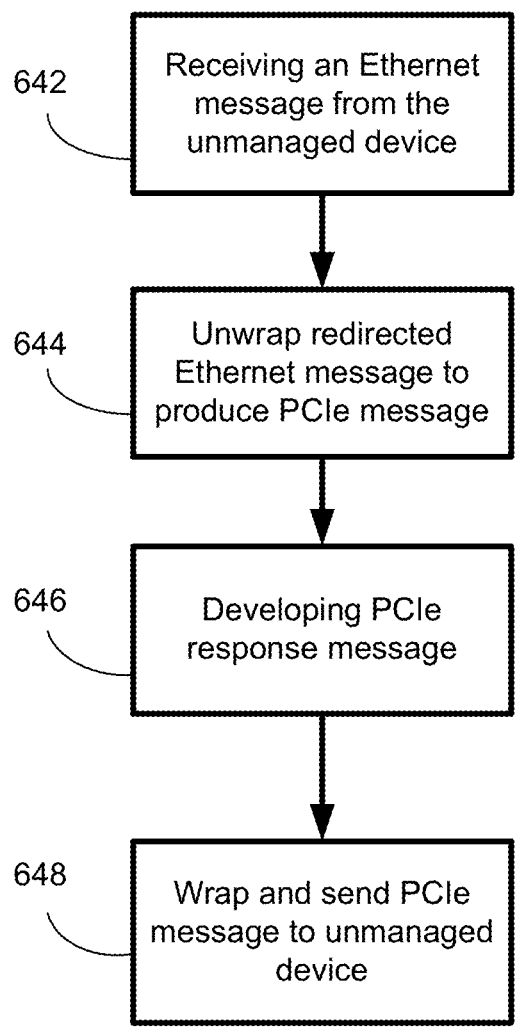
FIG. 6C is another extension of the method of FIG. 6A.

In some instances, the unmanaged device 530 may send messages to the managed device 502, such as interrupt or status messages. FIG. 6C is a method 640 of processing a message received from an unmanaged device 530 at a managed device 502. The method 640 may be implemented by the managed device 502, for example. At block 642, a message may be received from the unmanaged device 530. In one embodiment, the message may be received over an Ethernet transport using an Ethernet protocol. At block 644, the message may be de-encapsulated to produce a second format message, for example, a PCIe formatted message. At block 646, the second format message may be evaluated to determine what action, if any, should be taken with respect to the second format message. In circumstances where a response is required, a response message may be generated. In one embodiment, the response message may be formatted using the second protocol, for example, a PCIe protocol.

At block 648, the response message in the second protocol format may be encapsulated in a manner appropriate to the selected protocol, for example, an Ethernet protocol. The response message may be sent using the selected protocol over an appropriate transport. For example, when using an Ethernet protocol, the response message may be sent over an Ethernet network using a transmission control protocol (TCP) or a user datagram protocol (UDP).

Figure 7:
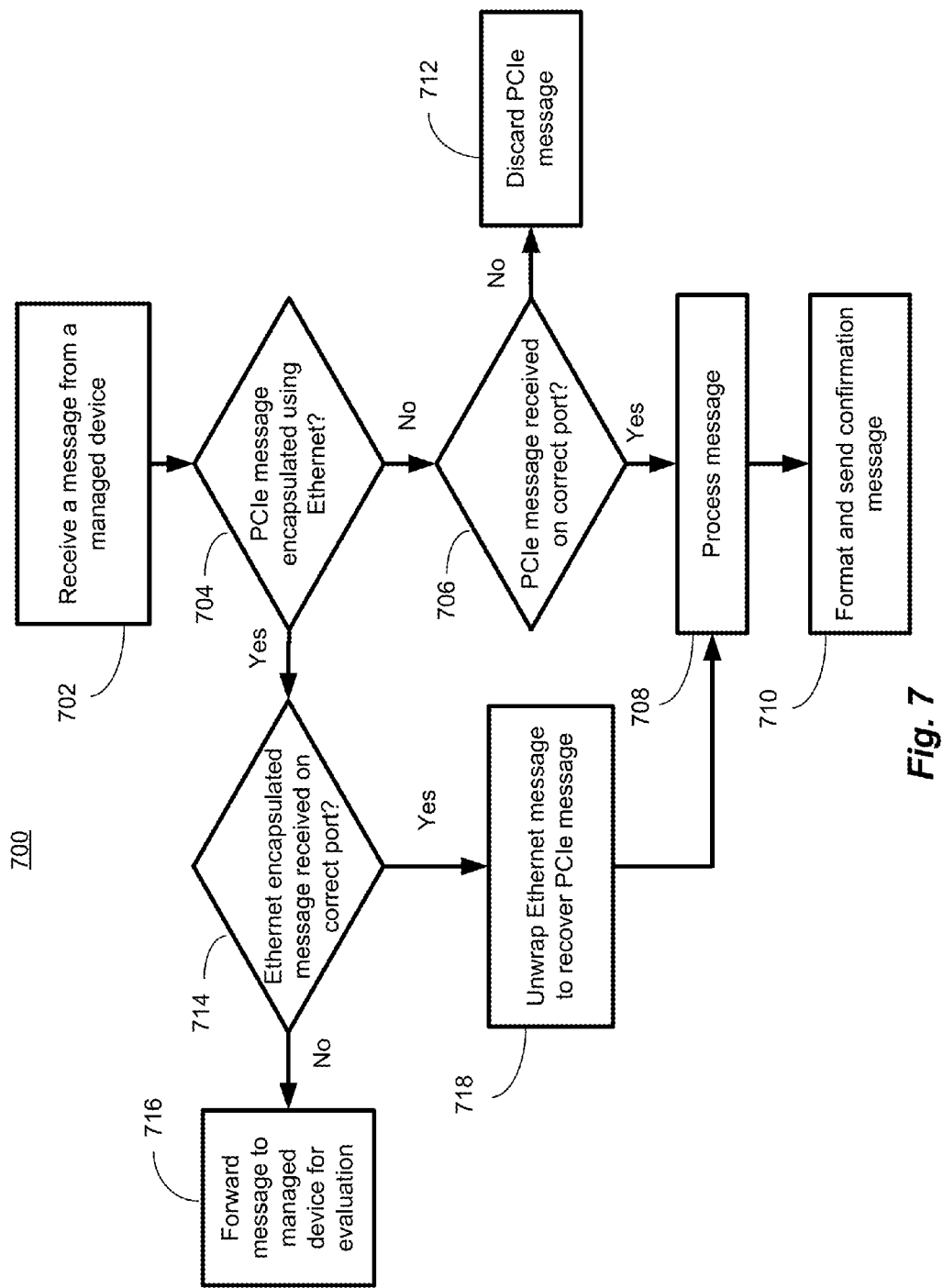
FIG. 7 is a method of accepting control commands from a managed device at an unmanaged device.

FIG. 7 is a method 700 of processing control or support messages at an unmanaged device, such as unmanaged device 530 of FIG. 5. At block 702, the unmanaged device 530 may receive a message from a managed device, such as managed device 502 of FIG. 5.

At block 704, a determination may be made as to whether the message is a PCIe message encapsulated using an Ethernet protocol. If not, the 'no' branch from block 704 may be taken to block 706. In some embodiments, for example, in a rack of equipment, PCIe messages may be sent directly between managed and unmanaged devices without the overhead of a transport protocol, such as Ethernet.

At block 706, a determination may be made as to whether the PCIe message was received on the correct port, assuming a two port system as shown in FIG. 5. If, at block 706, the PCIe message is received on the wrong port, that is, a port that is not intended for control/support traffic, the 'no' branch may be followed to block 712. At block 712, the PCIe message may be discarded.

If, at block 706, the PCIe message arrives at the correct port, that is, one dedicated to control/support messages, the 'yes' branch from block 706 may be taken to block 708. At block 708, the PCIe message may be processed. That is, the contents of the message may be analyzed and executed. For example, an indicator may be illuminated, or a register value may be set. At block 710, a confirmation message may be formatted and sent. The process may include developing the appropriate confirmation message using a protocol such as a PCIe protocol, encapsulating the confirmation message using a transport protocol, such as an Ethernet protocol, and sending the confirmation message using an appropriate transport.

If, at block 704, a determination is made that the message is a PCIe message encapsulated in using an Ethernet protocol, the 'yes' branch from block 704 may be taken to block 714.

At block 714, the port on which the message arrives at may be determined. If the Ethernet encapsulated message is received on an authorized port, the 'yes' branch from block 714 may be taken to block 718. At block 718, the Ethernet encapsulated message may be de-encapsulated to recover the PCIe message. Execution may continue at block 708.

If, at block 714, the determination is made that the message is received on an unauthorized port, when more than one is in use, the 'no' branch from block 714 may be taken to block 716. At block 716, the message may be forwarded to the managed device 502 for further evaluation. As discussed above, the managed device 502 may determine whether the message is valid and appropriate and, if so, return it to the unmanaged device 530.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. An apparatus for providing control support to an unmanaged device on a packet based computer network, the apparatus comprising:
   a processor configured to determine one or more non-core functions to be performed by an unmanaged device disposed on the packet based computer network;
   a control message generator configured to (i) generate a point-to-point control message conforming to a point-to-point control protocol for controlling the unmanaged device over a point-to-point serial bus connection to perform the determined one or more non-core functions, and (ii) encapsulate the point-to-point control message in a transport packet conforming to a packet switching protocol for transport over the packet based computer network, the transport packet wrapping the point-to-point control message with an additional protocol layer including a header; and
   a packet transmitter configured to transmit the transport packet including the encapsulated point-to-point control message via a port coupled to the packet based computer network, the packet based computer network configured to route the transport packet including the encapsulated point-to-point control message based on the header included in the transport packet so that the point-to-point control message is received at the unmanaged device via the packet based computer network.

2. The apparatus of claim 1, wherein the processor is further configured to:
   monitor one or more communications with the unmanaged device; and
   determine, based on the monitoring of one or more communications with the unmanaged device, the one or more non-core functions to be performed by the unmanaged device.

3. The apparatus of claim 1, wherein the processor is further configured to:

analyze one or more event messages received from the unmanaged device via the packet based computer network, the one or more event messages indicating one or more events at the unmanaged device that have been detected by the unmanaged device; and determine, based on the analysis of the one or more event messages, the one or more non-core functions to be performed by the unmanaged device.

4. The apparatus of claim 1, wherein the control message generator includes:

a first protocol interface coupled to the processor, the first protocol interface configured to:

receive, from the processor, one or more indications of the one or more non-core functions to be performed by an unmanaged device, and generate the point-to-point control message conforming to the point-to-point control protocol based on the one or more indications of the one or more non-core functions to be performed by an unmanaged device; and a second protocol interface coupled to the first protocol interface, the second protocol interface configured to:

encapsulate the point-to-point control protocol message in the transport packet conforming to the packet switching protocol.

5. The apparatus of claim 4, wherein:

the point-to-point control message is a first point-to-point control message;

the transport packet is a first transport packet;

the first protocol interface is further configured to:

receive, from the second protocol interface, a second point-to-point control message received from the unmanaged device via the packet based computer network, the second point-to-point control message conforming to the point-to-point control protocol, and provide, based on the second point-to-point control message, an event message to the processor, the event message indicating an event at the unmanaged device that was detected by the unmanaged device; and the second protocol interface is configured to:

receive, via the port, a second transport packet sent by the unmanaged device via the packet based computer network, the second transport packet conforming to the packet switching protocol, and de-encapsulate the second point-to-point control message from the second transport packet.

6. The apparatus of claim 1, wherein:

the point-to-point control protocol is a peripheral control interconnect express (PCIe) protocol; and the packet switching protocol is an Ethernet protocol.

7. The apparatus of claim 1, wherein:

the port is a first port designated for handling transport packets that include encapsulated point-to-point control messages; and the processor is configured to:

determine when transport packets including encapsulated point-to-point control messages are received via a second port not designated for handling transport packets that include encapsulated point-to-point control messages, and discard any point-to-point control messages corresponding to the encapsulated point-to-point control messages received via the second port.

8. A method for providing control support to an unmanaged first device disposed on a packet based computer network, the method comprising:

determining, at a second device disposed on the packet based computer network, one or more non-core functions to be performed by the unmanaged first device disposed on the packet based computer network;

generating, at the second device, a point-to-point control message conforming to a point-to-point control protocol for controlling the unmanaged first device over a point-to-point serial bus connection to perform the determined one or more non-core functions;

encapsulating, at the second device, the point-to-point control message in a transport packet conforming to a packet switching protocol for transport over the packet based computer network, the transport packet wrapping the point-to-point control message with an additional protocol layer including a header; and transmitting the transport packet that includes the encapsulated point-to-point control message via a port of the second device, the port being coupled to the packet based computer network, the packet based computer network being configured to route the transport packet including the encapsulated point-to-point control message based on the header included in the transport packet so that the point-to-point control message is received at the unmanaged first device via the packet based computer network.

9. The method of claim 8, further comprising:

monitoring, at the second device, one or more communications with the unmanaged first device; and based on the monitoring of one or more communications with the unmanaged first device, determining, at the second device, the one or more non-core functions to be performed by the unmanaged first device.

10. The method of claim 8, further comprising:

analyzing, at the second device, an event message received from the unmanaged first device via the packet based computer network, the event message indicating an event at the unmanaged first device that was detected by the unmanaged first device; and based on the analysis of the event message, determining, at the second device, the one or more non-core functions to be performed by the unmanaged device.

11. The method of claim 10, wherein:

the point-to-point control message is a first point-to-point control message;

the transport packet is a first transport packet;

the method further comprises:

receiving, via the port of the second device, a second transport packet sent by the unmanaged device via the packet based computer network, the second transport packet conforming to the packet switching protocol; and de-encapsulating, at the second device, a second point-to-point control message from the second transport packet, the second point-to-point control message including the event message.

12. The method of claim 8, wherein:

the point-to-point control protocol is a peripheral control interconnect express (PCIe) protocol; and the packet switching protocol is an Ethernet protocol.

13. The method of claim 8, wherein:

the port is a first port designated for handling transport packets that include encapsulated point-to-point control messages; and the method further comprises:

determining, at the second device, when transport packets including encapsulated point-to-point control messages are received via a second port of the second device, the second port not designated for handling transport packets that include encapsulated point-to-point control messages; and discarding, at the second device, any point-to-point control messages corresponding to the encapsulated point-to-point control messages received via the second port.

14. An apparatus, comprising:

a switch core device configured to direct data packets between a plurality of ports of an unmanaged device disposed on a packet based computer network;

a controller device configured to perform non-core functions at the unmanaged device, wherein the controller device performs the non-core functions responsive to control information received from a management device via the packet based computer network, the management device disposed on the packet based computer network;

an interface device configured to
  (i) de-encapsulate a point-to-point control message in a transport packet that conforms to a packet switching protocol, the transport packet (a) wrapping the point-to-point control message with an additional protocol layer including a header and (b) having been routed to the unmanaged device via the packet based computer network based on the header included in the transport packet, the point-to-point control message conforming to a point-to-point control protocol for controlling the unmanaged device over a point-to-point serial bus connection,
  (ii) retrieve control information from the point-to-point control message, the retrieved control information indicating one or more non-core functions to be performed at the unmanaged device, and
  (iii) provide the retrieved control information to the control device.

15. The apparatus of claim 14, wherein:

the point-to-point control message is a first point-to-point control message;

the transport packet is a first transport packet;

the controller device is further configured to detect events at the unmanaged device; and the interface device is further configured to:
  include indications of the detected events in second point-to-point control messages that conform to the point-to-point control protocol,
  encapsulate the second point-to-point control message in second transport packets conforming to the packet switching protocol for transport over the packet based computer network to the management device;

wherein the control information received from the management device via the packet based computer network is responsive to the second transport packets.

16. The apparatus of claim 14, wherein the interface device includes:

a first protocol interface coupled to a port of the unmanaged device, the first protocol interface configured to:
  de-encapsulate the point-to-point control message in the transport packet that conforms to the packet switching protocol; and a second protocol interface coupled to the first protocol interface, the second protocol interface configured to:
  (i) retrieve control information from the point-to-point control message, the retrieved control information indicating one or more non-core functions to be performed at the unmanaged device, and
  (ii) provide the one or more indications of the one or more non-core functions to be performed by the unmanaged device to the controller device.

17. The apparatus of claim 16, wherein:

the point-to-point control message is a first point-to-point control message;

the transport packet is a first transport packet;

the second protocol interface is further configured to:
  receive, from the controller device, an indication of an event detected by the controller device, and
  include the indication in a second point-to-point control message that conform to the point-to-point control protocol;

the first protocol interface is further configured to:
  encapsulate the second point-to-point control message in a second transport packet that conforms to the packet switching protocol for transport over the packet based computer network to the management device; and the first transport packet received from the management device via the packet based computer network is responsive to the first transport packet.

18. The apparatus of claim 14, wherein:

the point-to-point control protocol is a peripheral control interconnect express (PCIe) protocol; and the packet switching protocol is an Ethernet protocol.

19. The apparatus of claim 14, wherein:

the transport packet is received via a first port of the unmanaged device that is designated for handling transport packets that include encapsulated point-to-point control messages; and the controller device is configured to:
  determine when transport packets including encapsulated point-to-point control messages are received via a second port of the unmanaged device that is not designated for handling transport packets that include encapsulated point-to-point control messages, and
  discard any point-to-point control messages corresponding to the encapsulated point-to-point control messages received via the second port.

20. A method, comprising:

performing, at an unmanaged device, a packet switching function to direct data packets between a plurality of ports of the unmanaged device, the unmanaged device being disposed on a packet based computer network;

receiving, at the unmanaged device, a transport packet that conforms to a packet switching protocol, the transport packet (a) wrapping the point-to-point control message with an additional protocol layer including a header and (b) having been routed to the unmanaged device via the packet based computer network based on the header included in the transport packet, the transport packet having been transmitted by a management device via the packet based computer network;

de-encapsulating, at the unmanaged device, a point-to-point control message in the transport packet, the point-to-point control message conforming to a point-to-point control protocol for controlling the unmanaged device over a point-to-point serial bus connection; and performing, at the unmanaged device, a non-core function responsive to and indicated by control information in the point-to-point control message, the non-core function having been determined by the management device.

21. The method of claim 20, wherein:

the point-to-point control message is a first point-to-point control message;

the transport packet is a first transport packet;

the method further comprises:

detecting, at the unmanaged device, an event that occurred at the unmanaged device;

including, at the unmanaged device, an indication of the detected event in a second point-to-point control message that conforms to the point-to-point control protocol;

encapsulating, at the unmanaged device, the second point-to-point control message in a second transport packet conforming to the packet switching protocol for transport over the packet based computer network to the management device; and transmitting the second transport packet to the management device via the packet based computer network;

wherein the first transport packet received from the management device via the packet based computer network is responsive to the second transport packet.

22. The method of claim 20, wherein:

the point-to-point control protocol is a peripheral control interconnect express (PCIe) protocol; and the packet switching protocol is an Ethernet protocol.

23. The method of claim 20, wherein:

the transport packet is received via a first port of the unmanaged device that is designated for handling transport packets that include encapsulated point-to-point control messages; and the method further comprises:

determining, at the unmanaged device, when transport packets including encapsulated point-to-point control messages are received via a second port of the unmanaged device that is not designated for handling transport packets that include encapsulated point-to-point control messages, and discarding, at the unmanaged device, any point-to-point control messages corresponding to the encapsulated point-to-point control messages received via the second port.

\* \* \* \* \*